United States Patent
Camp

(10) Patent No.: US 8,613,093 B2
(45) Date of Patent: Dec. 17, 2013

(54) SYSTEM, METHOD, AND COMPUTER PROGRAM PRODUCT FOR COMPARING AN OBJECT WITH OBJECT ENUMERATION RESULTS TO IDENTIFY AN ANOMALY THAT AT LEAST POTENTIALLY INDICATES UNWANTED ACTIVITY

(75) Inventor: Tracy E. Camp, Beaverton, OR (US)

(73) Assignee: McAfee, Inc., Santa Clara, CA (US)

( * ) Notice: Subject to any disclaimer, the term of this patent is extended or adjusted under 35 U.S.C. 154(b) by 1146 days.

(21) Appl. No.: 11/839,225

(22) Filed: Aug. 15, 2007

(65) Prior Publication Data
US 2013/0247180 A1    Sep. 19, 2013

(51) Int. Cl.
G06F 12/14    (2006.01)
G06F 11/00    (2006.01)

(52) U.S. Cl.
USPC .......................................................... 726/24

(58) Field of Classification Search
None
See application file for complete search history.

(56) References Cited

U.S. PATENT DOCUMENTS

| | | | | |
|---|---|---|---|---|
| 5,883,956 A * | 3/1999 | Le et al. | ........................ | 713/170 |
| 5,987,610 A | 11/1999 | Franczek et al. | | |
| 6,053,947 A * | 4/2000 | Parson | ............................. | 703/14 |
| 6,073,142 A | 6/2000 | Geiger et al. | | |
| 6,460,050 B1 | 10/2002 | Pace et al. | | |
| 6,928,555 B1 * | 8/2005 | Drew | ............................... | 726/24 |
| 7,467,378 B1 * | 12/2008 | Sobel | ............................... | 717/168 |
| 7,506,155 B1 | 3/2009 | Stewart et al. | | |
| 7,512,980 B2 * | 3/2009 | Copeland et al. | ............... | 726/23 |
| 7,603,715 B2 * | 10/2009 | Costa et al. | ..................... | 726/25 |
| 2002/0046275 A1 * | 4/2002 | Crosbie et al. | ................ | 709/224 |
| 2006/0294592 A1 * | 12/2006 | Polyakov et al. | ............... | 726/24 |
| 2007/0067623 A1 * | 3/2007 | Ward | ............................ | 713/164 |
| 2007/0079178 A1 * | 4/2007 | Gassoway | ....................... | 714/38 |
| 2008/0016571 A1 | 1/2008 | Chang | | |

OTHER PUBLICATIONS

"Windows Sysinternals," Microsoft TechNet, Microsoft Corporation, 2007, http://www.microsoft.com/technet/sysinternals/default.mspx.
"F-Secure Blacklight," http://www.f-secure.com/blacklight/.
Butler, Jamie, and Greg Hoglund. "VICE—Catch the hookers!" Proceedings of Black Hat USA 2004 Briefings & Training, Jul. 24-29, 2004. Las Vegas, NV.
Butler, Jamie, and Peter Silberman. "RAIDE: Rootkit Analysis Identification Elimination." Proceedings of Black Hat USA 2006 Briefings and Training, Jul. 29-Aug. 3, 2006. Las Vegas, NV.

* cited by examiner

*Primary Examiner* — Philip Chea
*Assistant Examiner* — Fatoumata Traore
(74) *Attorney, Agent, or Firm* — Patent Capital Group

(57) ABSTRACT

A system, method, and computer program product are provided for comparing an object with object enumeration results to identify at least potentially unwanted activity. In use, a change in a state of an object is identified. Additionally, the object is compared with results of an object enumeration. Further, at least potentially unwanted activity is identified based on the comparison.

16 Claims, 6 Drawing Sheets

SYSTEM, METHOD, AND COMPUTER PROGRAM PRODUCT FOR COMPARING AN OBJECT WITH OBJECT ENUMERATION RESULTS TO IDENTIFY AN ANOMALY THAT AT LEAST POTENTIALLY INDICATES UNWANTED ACTIVITY

FIELD OF THE INVENTION

The present invention relates to detecting anomalous activity that at least potentially indicates unwanted computer system activity, and more particularly to software security systems for detecting anomalous activity that at least potentially indicates unwanted computer system activity.

BACKGROUND

Security systems have generally been developed for detecting unwanted activity. For example, such unwanted activity has oftentimes been a result of unwanted code (e.g. root kits, etc.). In some security systems, unwanted activity has been detected utilizing signature-based techniques, in which code is compared to known unwanted code to determine whether such code matches the known unwanted code. However, such signature-based techniques have various limitations. For example, signature-based techniques customarily require identification of known unwanted code, before the aforementioned comparison can take place. In addition, signature-based techniques are also sometimes capable of being circumvented by maliciously changing computer system memory content to be different than memory content that is executed.

In other security systems, unwanted activity has been detected utilizing differencing-based techniques, in which different views of a system (e.g. with respect to different operating system contexts, different object enumerations, etc.) are compared for identifying anomalous discrepancies in internal and external operating system objects. Unfortunately, such differencing-based techniques also have various limitations. For example, differencing-based techniques conventionally rely on specialized internal knowledge of the system to be secured. Utilizing such specialized and often privileged implementation details presents challenges in keeping detection software up to date when the underlying software system changes (e.g. such as, for example, when a software platform changes, etc.), and potentially makes changes to the internal implementation details that were previously relied upon. Further, differencing-based techniques many times result in false positive identification of unwanted activity due to inaccurate comparisons resulting from race conditions and the like. For example a false positive detection may be generated if a file is created or deleted between the start of a differencing comparison and the end of such differencing comparison.

There is thus a need for addressing these and/or other issues associated with the prior art.

SUMMARY

A system, method, and computer program product are provided for comparing an object with object enumeration results to identify an anomaly that at least potentially indicates unwanted activity. In use, a change in a state of an object is identified from a public interface of a software system. Additionally, the object is compared with results of an object enumeration. Further, an anomaly that at least potentially indicates unwanted activity is identified based on the comparison.

DETAILED DESCRIPTION

Figure 1:
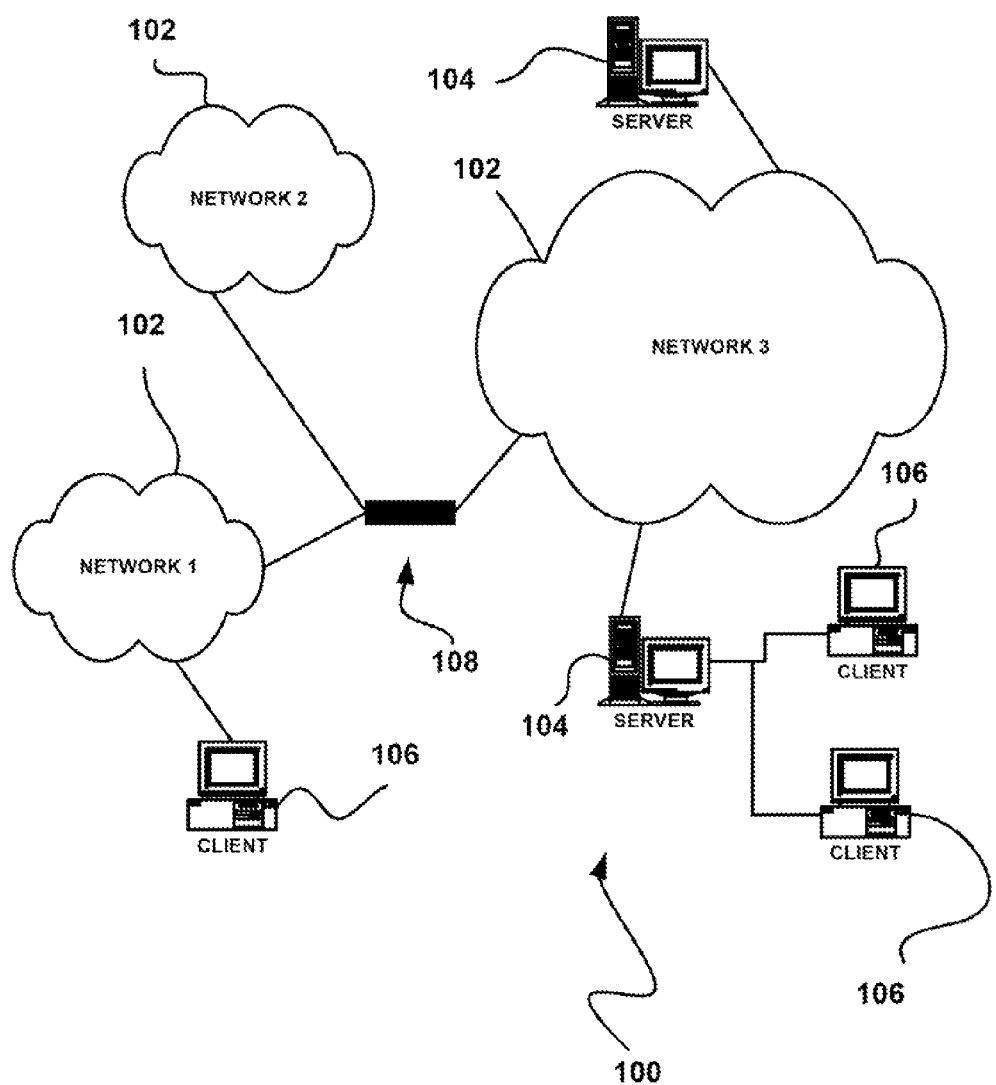
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
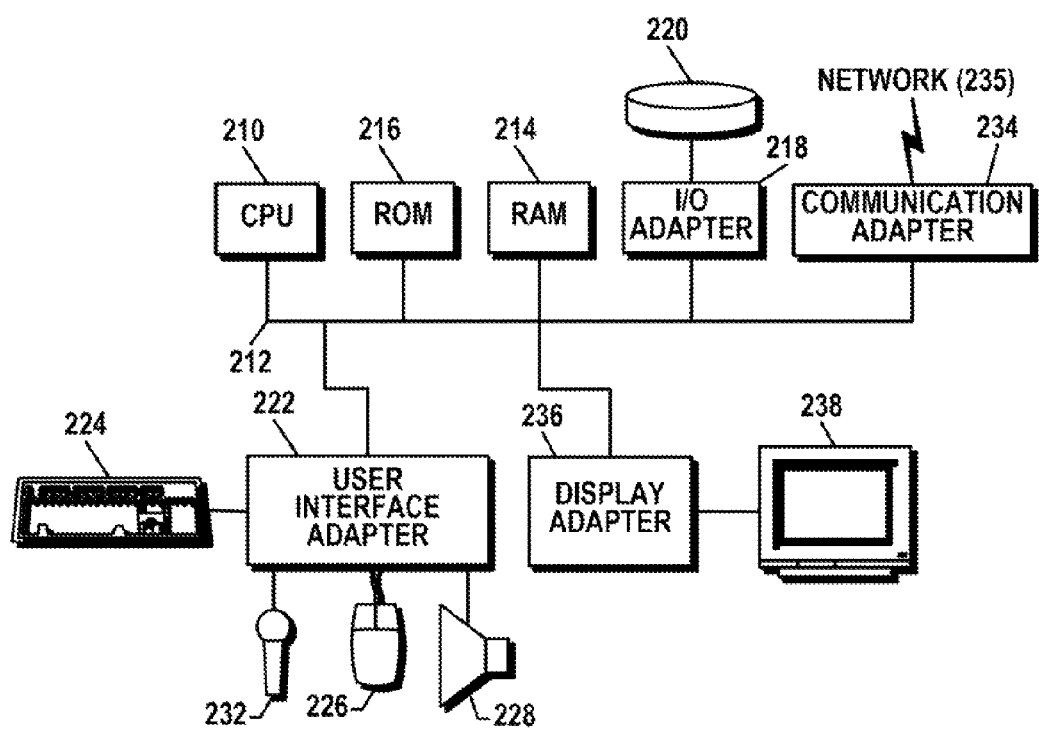
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications. Of course, other embodiments may not necessarily utilize OOP, either in implementation or in the underlying operating system.

Of course, the various embodiments set forth herein may be implemented utilizing hardware, software, or any desired combination thereof. For that matter, any type of logic may be utilized which is capable of implementing the various functionality set forth herein.

Figure 3:
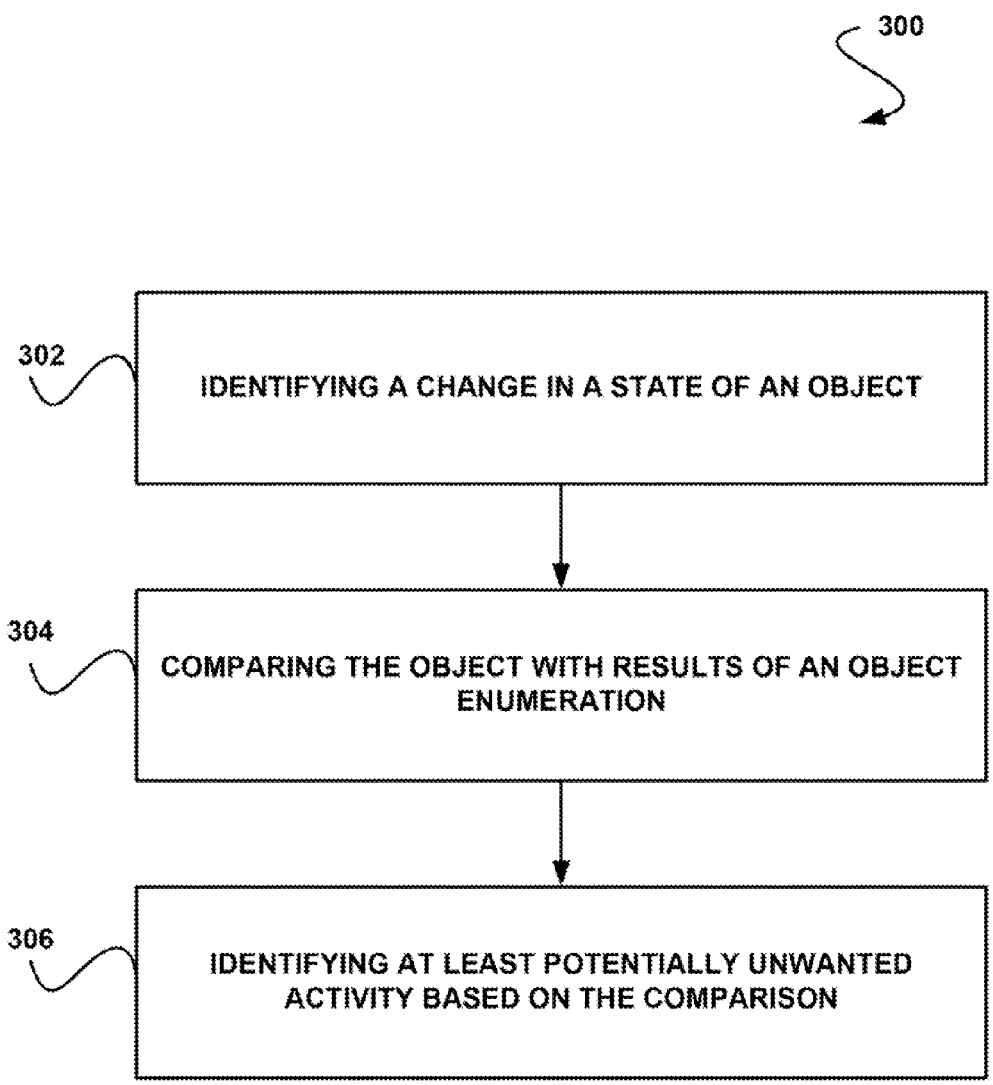
FIG. 3 shows a method for comparing an object with object enumeration results to identify an anomaly that at least potentially indicates unwanted activity, in accordance with one embodiment.

FIG. 3 shows a method 300 for comparing an object with object enumeration results to identify an anomaly that at least potentially indicates unwanted activity, in accordance with one embodiment. As an option, the method 300 may be carried out in the context of the architecture and environment of FIGS. 1 and/or 2. Of course, however, the method 300 may be carried out in any desired environment.

As shown in operation 302, a change in a state of an object from a public interface of a software system is identified. In the context of the present description, the object may include any object for which a change in a state may be identified. In various embodiments, the object may include a file, a registry object, a process, a driver, a code module, etc. Optionally, the object may be located on (e.g. stored on, etc.) a device and/or contained utilizing any stored format (e.g. a file system format, etc.). Just by way of example, such device may include any of the devices described above with respect to FIGS. 1 and/or 2.

As an option, the object may be included in a predetermined list of objects. For example, the predetermined list may indicate any number of different objects for which changes in a state may be identified. Further, such objects may include objects to which changes may be made utilizing the public interface. In one embodiment, the predetermined list of objects may be particular to an operating system (e.g. MICROSOFT® WINDOWS NT®, LINUX®, SOLARIS™, UNIX®, Mac OS® X, etc.). Thus, a plurality of different predetermined lists of objects may optionally be utilized based on an operating system. Just by way of example, such predetermined list of objects may include an EPROCESS object, a FILE_OBJECT, a DEVICE_OBJECT, a REGISTRY_KEY NT object, etc.

Further, the state of the object for which a change is identified may include any condition, status, etc. capable of being associated with the object. In various embodiments, the state of the object may include an open state, a write state, a read state, a close state, etc. In addition, the state of the object may be changed in any desired manner that is from the public interface of the software system. Such public interface may include any interface [e.g. application program interface (API), etc.] of a software system (e.g. operating system, application, etc.) capable of being utilized for changing the state of the object. Such public interface may include a high level interface, for example.

In one embodiment, the state of the object may be changed as a result of an object manipulation request. Accordingly, the state of the object may optionally be changed in response to a request (e.g. from an application, from a process, etc.) for such change. Still yet, the change of the state of the object may be identified by monitoring the public interface, in one embodiment. For example, object manipulation events associated with the public interface may be identified based on the monitoring.

In another embodiment, a filter driver (e.g. of a security system, etc.) may be utilized for identifying the change in the state of the object. In another embodiment, the monitoring of the public interface and the filter driver may be utilized in combination for identifying changes in states of objects, such as, for example, in the case where the filter driver may be unable to identify changes in states of driver and/or device objects. Of course, it should be noted that the change in the state of the object (e.g. from the public interface, etc.) may be identified in any desired manner.

Additionally, as shown in operation 304, the object is compared with results of an object enumeration. To this end, the object may be compared with the results of the object enumeration in response to the identification of the change in the state of the object (operation 302). In the context of the present embodiment, the object enumeration may include any function, process, etc. capable of enumerating (e.g. identifying, listing, itemizing, etc.) at least one object. For example, the object enumeration may be performed utilizing an API. As another example, the object enumeration may be performed utilizing a kernel enumeration interface.

Optionally, the object enumeration may enumerate at least one object stored in memory, such as, for example, in particular directories, etc. In one exemplary embodiment, the object enumeration may be performed with respect to at least one specific directory associated with the object for which the changed state is identified. For example, the object enumeration may be performed with respect to a directory in which the object is expected to be included.

Further still, a plurality of object enumerations may be predefined, in that each object enumeration may be associated with at least one type of state capable of being associated with an object. Therefore, the object enumeration may be based on the change in the state of the object. As another option, the object enumeration may include a query for the object. To this end, the results of the object enumeration may include a plurality of objects (e.g. a list of objects, etc.) and/or a single object identified based on the enumeration.

Thus, comparing the object with the results of the object enumeration may include determining whether the object exists in the results of the object enumeration. Just by way of example, the object may be compared to at least one object included in the results of the object enumeration. As another option, comparing the object with the results of the object enumeration may include determining whether the object matches any object within the results of the object enumeration. Optionally, the comparison may be preformed with respect to all or only a portion of aspects of the object visible within the enumeration results.

As an option, the object may be compared with the results of the object enumeration based on a policy. For example, the policy may indicate that, for each of a plurality of objects for which a state has changed, the comparison is to be performed randomly, in one embodiment. In another embodiment, the policy may indicate that, for each of the plurality of objects for which a state has changed, the comparison is to be performed only once per run-time.

Furthermore, an anomaly that at least potentially indicates unwanted activity is identified, based on the comparison. Note operation 306. In the context of the present description, the unwanted activity may include any activity that is predetermined to be unwanted. To this end, the at least potentially unwanted activity may include activity which indicates that it may be unwanted. For example, in one embodiment, the at least potentially unwanted activity may include hiding the object from being identified via the object enumeration. As another example, the at least potentially unwanted activity may include removing the object from a list that a kernel utilizes for the object enumeration. Moreover, the at least potentially unwanted activity may be maliciously performed.

For example, the at least potentially unwanted activity may be associated with a rootkit, such as a direct kernel object manipulation (DKOM) rootkit.

Just by way of example, the anomaly may include the nonexistence of the object in the results of the object enumeration, which may further indicate that the object may be maliciously hidden. Of course, it may also be a possibility that the object may be hidden legitimately with respect to an authorized process, program, etc. In this way, an anomaly may be identified that at least potentially indicates unwanted activity, if it is determined that the object does not match any portion of (e.g. any objects included in, etc.) the results of the object enumeration, in one embodiment.

In another optional embodiment, the anomaly at least potentially indicating unwanted activity may not be identified, if it is determined that the object matches at least a portion of the results of the object enumeration. Accordingly, the anomaly at least potentially indicating unwanted activity may be identified by comparing the object for which a state has changed, with the object enumeration results. Such comparison may thus eliminate a requirement of detailed knowledge of a system (e.g. information associated with file system internal design, registry internals, etc.), and may further provide real-time detection of at least potentially unwanted activity.

In one optional embodiment, the identification of the anomaly that at least potentially indicates unwanted activity may initiate an analysis. For example, a process, and optionally an associated code module, which requested the change in the state of the object may be analyzed. Moreover, the analysis may determine whether the at least potentially unwanted activity is, in fact, unwanted (e.g. is malicious, is a rootkit, etc.). In another optional embodiment, the identification of the anomaly that at least potentially indicates unwanted activity may initiate a report regarding such identification.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
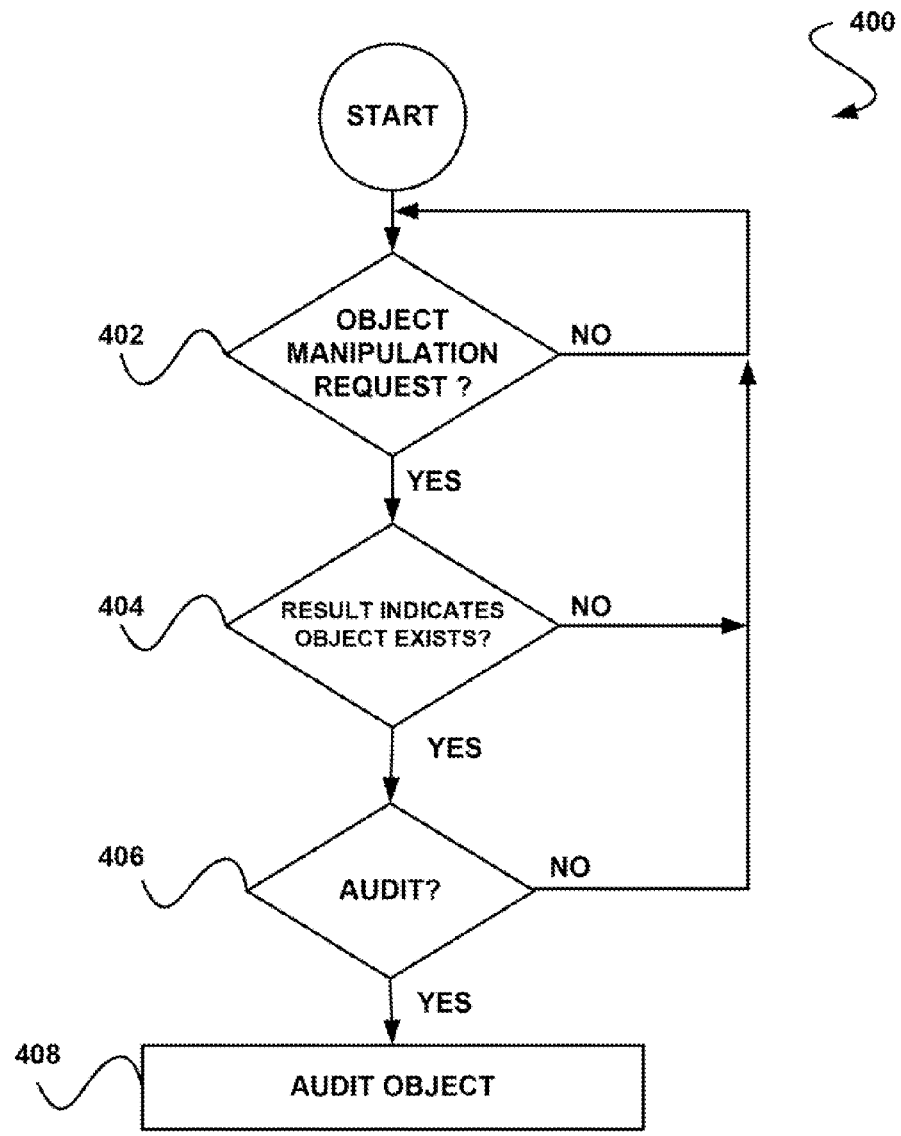
FIG. 4 shows a method for determining whether to audit an object, in accordance with another embodiment.

FIG. 4 shows a method 400 for determining whether to audit an object, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in decision 402, it is determined whether an object manipulation request has been issued. The object manipulation request may include any request to change the state of an object, for example, by requesting to open the object, write to the object, read the object, close the object, etc. In one exemplary embodiment, the object manipulation request may be issued from a process.

In one embodiment, the object manipulation request may be identified utilizing a hook. For example, the hook may be placed in an API utilized for changing the state of the object. As another example, the hook may be placed in a filter driver capable of detecting the object manipulation request. To this end, the hook may be utilized for controlling a process to determine whether to audit the object, as described in the context of FIG. 4. For example, such process may be controlled by initiating the process (e.g. by setting a completion callback, etc.) in response to a determination that the object manipulation request has been issued.

In response to a determination that the object manipulation request has been issued, it is determined whether a result of the request indicates that the object exists. Note decision 404. In the context of the present embodiment, the object may exist if the object is capable of being manipulated. For example, if the object is manipulated (such that a state of the object changes) in response to the request, the result of the request may be a successful result. To this end, such successful result may indicate that that the object exists. In one embodiment, the determination may be made utilizing a call to a completion callback.

Further, in response to a determination that the object exists, it is determined whether an audit is to be performed on the object, as shown in decision 406. In the present embodiment, such audit may include any determination of whether an anomaly that at least potentially indicates unwanted activity is identified based on a comparison of the object with results of an object enumeration. Thus, the audit may include determining whether the anomaly is associated with the object. Just by way of example, the audit may include the audit described below with respect to FIG. 5.

In one embodiment, the determination of whether the audit is to be performed may be based on a policy. For example, such policy may indicate that the audit is to be performed randomly. Thus, for each of a plurality of objects for which a state has changed, the audit may be performed randomly (e.g. based on a random selection algorithm, etc.). Such random auditing may prevent code that initiates unwanted activity, such as rootkits, from circumventing the audit (e.g. by predetermining the exact time the audit will be performed, etc.).

As another example the policy may indicate that the audit is to be performed only once per run-time for the object. Optionally, a cache may be utilized for indicating whether an audit has been performed for each of a plurality of objects with respect to a current run-time. As another option, in the case of persistent objects on stable storage, the cache may be utilized for indicating whether an audit has been performed since a last modification of the object in a current and/or a previous run-time. As yet another example, the policy may indicate that the audit is to be performed when use of system resources utilized by the audit is below a predefined threshold amount (e.g. when the system is idle, etc.).

While various examples of policies have been described in the context of the present embodiment, it should be noted that the policy may include any one or more rules, etc. for determining whether to audit the object. Moreover, the policy may be customized as desired (e.g. manually, automatically, etc.), in one embodiment. Performing the audit based on the policy may provide efficiency and also effectiveness, for example, by limiting use of system resources by the audit and/or preventing detection of future audits by code that initiates unwanted activity.

In response to a determination that the audit is to be performed on the object, the object is audited. Note operation 408. Optionally, the object may be queued for auditing, such as, for example, where a plurality of objects is to be audited. In one embodiment, the object may be audited utilizing a process different from the process in which the object was manipulated. In other example, an advanced process control may be sent to another thread, an administrative tool may perform the audit via an internal local procedure call, etc. Optionally, such process may be selected randomly. For example, the randomly selected process may include a process unrelated to security system software utilized for performing the audit by injecting code or creating additional threads within the selected processes' context. Utilizing such different process may prevent code that initiates unwanted activity from adapting its behavior to the process in which the audit is performed.

In another embodiment, the object may be audited utilizing a predetermined process, such as a task manager process, a security system process, etc. Utilizing such processes may optionally require code that initiates unwanted activity to be subject to various detection techniques (e.g. signature-based scanning, etc.), for example, if such code has adapted to return correct results to the enumeration interface which include the object. Of course, it should be noted that the object may be audited utilizing any desired process.

As an option, the object audit modules may only be particular to predetermined objects, such that audits may only be performed on such predetermined objects. Predetermining such objects may prevent false positive audit results, for example, by not auditing objects which are capable of resulting in false positive audit results.

Table 1 illustrates one example of a mapping of particular changes in a state of an object and object audit modules associated therewith. Such mapping may be utilized for identifying an object audit module. It should be noted that the mapping illustrated in Table 1 is set forth for illustrative purposes only, and thus should not be construed as limiting in any manner.

TABLE 1

| Object Manipulation Event | Auditable Object Enumeration Interface |
|---|---|
| IRP_MJ_CREATE resulting in a SUCCESS create (IRP = I/O request packet) | IRP_MJ_CREATE/FILE_OPEN_TARGET_DIRECTORY success and IRP_MJ_DIRECTORY_CONTROL/IRP_MN_QUERY_DIRECTORY/ FileFullDirectoryIInformation for file name opened. |
| IRP_MJ_CREATE with alternate data stream as target | IRP_MJ_CREATE to base file name success. IRP_MJ_QUERY_INFORMATION/FileStreamInformation( ) for alternate data stream opened. |
| IRP_MJ_CREATE with extended attribute | IRP_MJ_CREATE to base file name success. IRP_MJ_QUERY_INFORMATION/FileEaInformation for EA created. |
| IRP_MJ_CREATE w/ any status. | ZwQuerySystemInformation( )/SystemProcessesAndThreadsInformation contains the current process and thread. The current thread belongs to the current process. |
| Handle objects associated with FILE_OBJECTS we handle IRPs for. | Handles owning processes exists in ZwQuerySystemInformation( )/SystemProcessInformation. |
| Handle objects associated with FILE_OBJECTS we handle IRPs for | Handle exists in ZwQuerySystemInformation( )/SystemHandleInformation |
| IRP_MJ_DIRECTORY_CONTROL/ IRP_MN_CHANGE_NOTIFY (this should also be used to invalidate the scan cache) | IRP_MJ_CREATE w/ SUCCESS status and IRP_MJ_DIRECTORY_CONTROL/IRP_MN_QUERY_DIRECTORY/ FileFullDirectoryInformation for target of change notify. |
| RegNtPostCreateKey, RegNtPostCreateKeyEx, RegNtPostOpenKey, RegNtPostOpenKeyEx registry callbacks with a SUCCESS status | ZwOpenKey( )/ZwEnumerateKey( ) for the key opened. |
| RegNtPost* callback with any status | ZwQuerySystemInformation( )/SystemProcessesAndThreadsInformation contains the current process and thread. The current thread belongs to the current process. |
| TDI callbacks (TDI = transport datagram interface which is a networking API) | ZwQuerySystemInformation( )/SystemProcessesAndThreadsInformation contains the current process and thread. The current thread belongs to the current process. |

Figure 5:
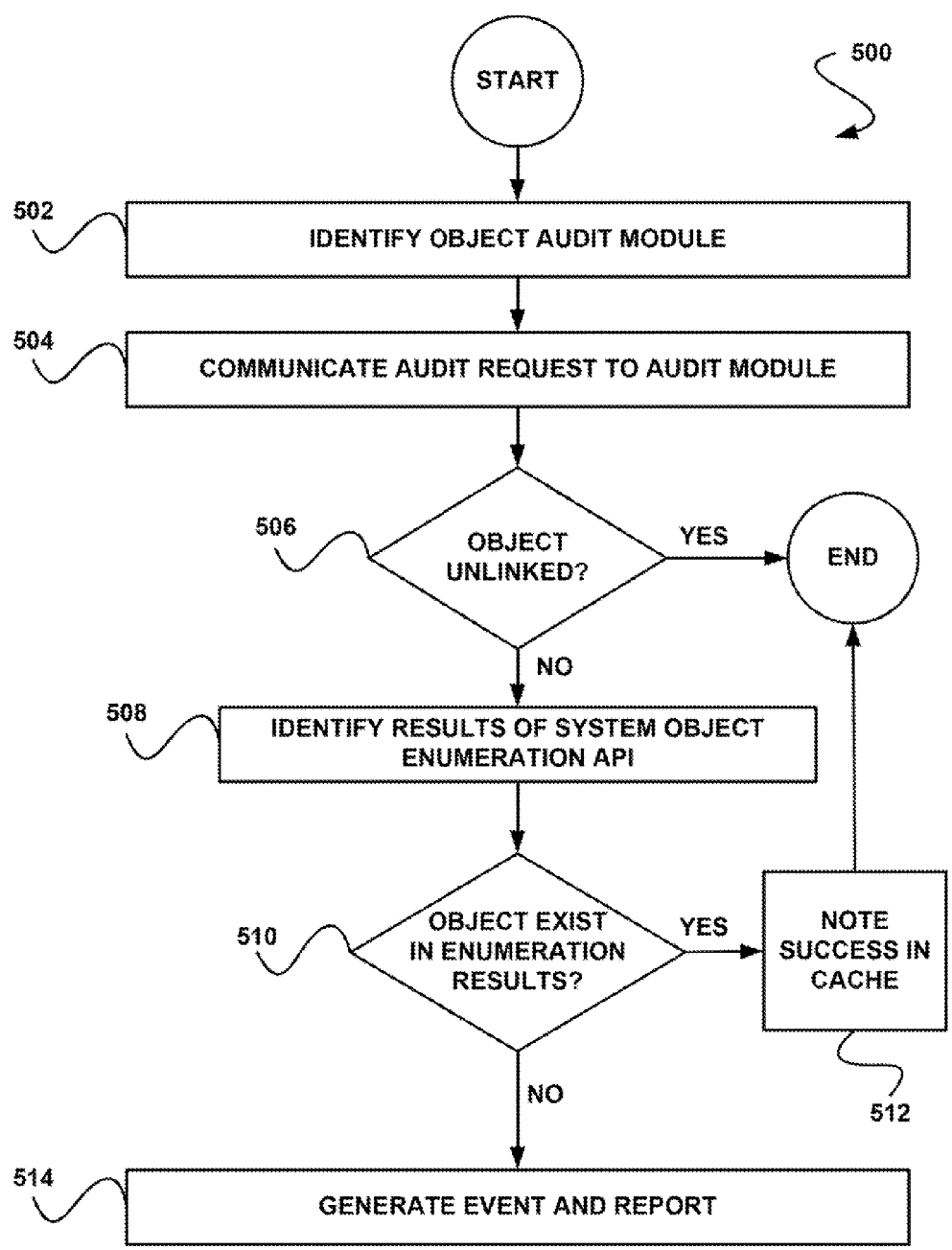
FIG. 5 shows a method for auditing an object, in accordance with yet another embodiment.

FIG. 5 show a method 500 for auditing an object, in accordance with yet another embodiment. As an option, the method 500 may be carried out in the context of the architecture and environment of FIGS. 1-4. For example, in one embodiment, the method 500 may be performed in the context of operation 408 of FIG. 4. Of course, however, the method 500 may be carried out in any desired environment. Again, it should also be noted that the aforementioned definitions may apply during the present description.

As shown in operation 502, an object audit module is identified. In the context of the present embodiment, the object audit module may include any module capable of being utilized for auditing an object. For example, the object audit module may include code for auditing the object. In addition, the object audit module may be identified utilizing an audit engine capable of executing the object audit module.

In one embodiment, the object audit module may be identified based on the object to be audited. In another embodiment, the object audit module may be identified based on a particular change in a state of such object. Thus, the object audit module may be selected from a plurality of object audit modules (e.g. stored in a database, etc.), based on the object to be audited and/or a state change associated with such object.

As shown in the left column of Table 1, the object manipulation event may include the change of the state of the object which initiated the auditing of the object. In addition, in the right column of Table 1, the auditable object enumeration interface may include the object audit modules particular to each of the object manipulation events. Thus, in response to identification of a change in a state of an object, an object audit module associated therewith may be identified, utilizing a mapping.

Furthermore, an audit request is communicated to the identified object audit module, as shown in operation 504. Such request may include any request for the object audit module to perform the audit on the associated object. For example, the request may indicate the object for which an audit is being requested.

In response to the audit request (e.g. receipt of such request by the object audit module, etc.), it is determined whether the object has been unlinked. Note decision 506. Such determination may be made based on tracking results of a state of the object. For example, such tracking may be initiated in response to the change in the state of the object.

In one embodiment, determining whether the object has been unlinked (e.g. deleted, destructed cleaned up from the system, etc.) may involve determining whether the object has been unlinked from an object name space. Of course, it may be determined whether the object has been unlinked in any manner. Such determination may prevent false positive results for the audit when the object is unlinked prior to performing an object enumeration, as described below with respect to operation 508.

To this end, as shown in operation 508, results of an object enumeration are identified. In one embodiment, the results of the object enumeration may be identified by performing the object enumeration. Such object enumeration may be performed utilizing the object audit module, for example. With respect to such example, the object audit module may specify the object enumeration to be performed (see right column of Table 1, for example). While only a single object enumeration is described herein, it should be noted that any number of object enumerations may be performed (e.g. with respect to different directories, etc.).

In another embodiment, the results of the object enumeration may be identified from a cache. For example) the cache may store results of a previously performed object enumeration. In this way, a plurality of audits performed on the same and/or different objects may utilize a single instance of object enumeration results stored in cache. Optionally, results stored in such cache may be randomly deleted, such that an object enumeration may be required to be performed subsequent to such deletion. To this end, the results of the object enumeration may include at least one enumerated object.

In response to identification of the results of the object enumeration, it is determined whether the object for which a state has changed is included in the enumeration results. Note decision 510. Such determination may be made by comparing the object to the results, for example. In this way, the object may be compared to the results only if it is determined that the object is linked (decision 506). In response to a determination that the object is included in the results, a successful comparison may be noted in cache (see operation 512). For example, such cache may be utilized for determining whether the object has been previously audited, such that future audits of the object may be prevented by identifying such success in the cache (e.g. based on an audit policy, etc.).

If, however, it is determined that the object is not included in the enumeration results, an event and a report are generated, as shown in operation 514. In the context of the present embodiment, the event may include notifying an administrator, further analyzing a process which requested the state of the object to be changed, etc. Optionally, the generated event may be filtered against a list of known false positive detections of unwanted activity and/or unwanted code.

In addition, the report may be sent to an administrative tool, to a user, etc. Optionally, the report may include any details associated with the audit and/or object. In one embodiment, the report may be analyzed with respect to other reports for detecting whether unwanted activity, and thus associated unwanted code, is present.

As a further option, a secondary audit may be performed with respect to the audit (not shown). For example, such secondary audit may be performed based on information identified during the primary audit performed by the object audit module, as described above. Such secondary audit may optionally provide additional details about the internal consistency of an operating system. For example, such additional details may be utilized for directly detecting unwanted code (e.g. rootkits, etc.) and/or as feedback for indicating suspicious activity.

Table 2 illustrates an exemplary mapping of information identified during the primary audit and secondary audits that may be performed based on such information. Again, it should be noted that the mapping illustrated in Table 2 is set forth for illustrative purposes only, and thus should not be construed as limiting in any manner. As shown, the left column of Table 2 specifies the information identified during the primary audit. In addition, the right column of Table 2 maps specific secondary audits to such information.

TABLE 2

| Object/Information | Audit Checks |
|---|---|
| ZwQuerySystemInformation( )/SystemModuleInformation returned information. | Enum structures are internally consistent between NextEntryOffset and space utilized by the current entry. (note it may be possible to restore hidden entries) |
| ZwQuerySystemInformation( )/SystemSystemProcessAndThreadsInformation returned information | Enum structures are internally consistent between NextEntryOffset and space utilized by current entry. (note it may be possible to restore hidden entries) |
| IRP_MJ_DIRECTORY_CONTROL/IRP_MN_QUERY_DIRECTORY returned information. | Enum structures are internally consistent between NextEntryOffset and space utilized by the current entry. (note it may be possible to restore hidden entries) |
| PROCESS objects | All processes in the processes' job object are visible via ZwQuerySystemInformation( )/SystemPorcessAndThreadInformation. |
| PROCESS objects | The processes Token object has not changed since the system reported its creation via a PsSetCreateProcessNotifyRoutine( ) callback. |
| DEVICE objects | Can the device object be found in the ¡Device directory? |
| DRIVER objects | Do all dispatch entry points point to code within the module. Are those entry points trivially patched? Is the IAT hooked? (IAT = import address table which resolves dynamically linked library references at run-time) |
| A DRIVER object in a I/O stack we attach to | ZwQuerySystemInformation( )/SystemModule Information contains the driver module. |

TABLE 2-continued

| Object/Information | Audit Checks |
|---|---|
| IRP_MJ_QUERY_INFORMATION/ FileStreamInformation returned information. | Enum structures are internally consistent between NextEntryOffset and space utilized by the current entry. (note it may be possible to restore hidden entries) |
| IRP of any type | Are the device objects in the IRP stack exist in ZwQuerySystemInformation( )/SystemModule Information. |

Figure 6:
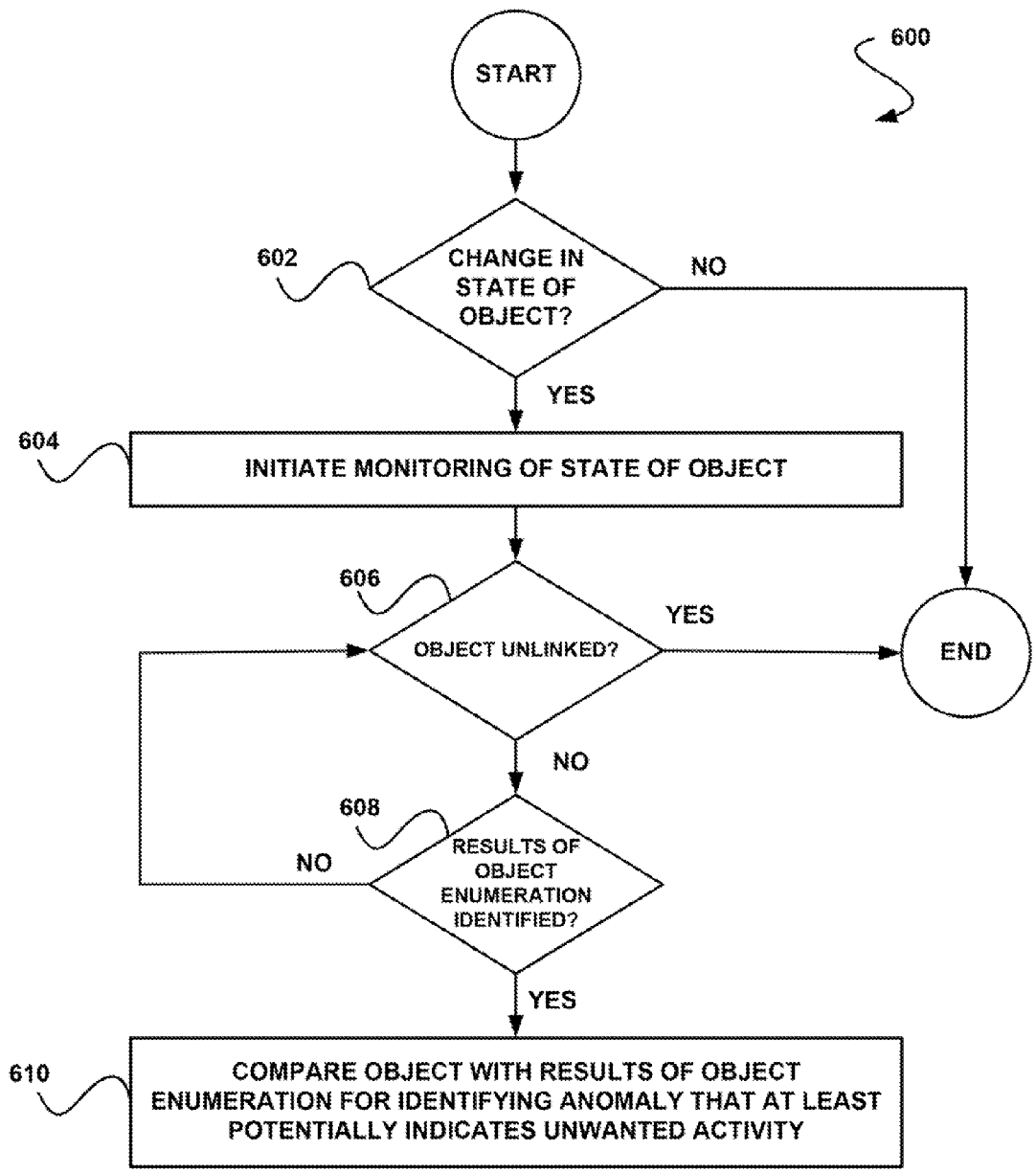
FIG. 6 shows a method for tracking a state of an object between identification of a change in the state of the object and identifying object enumeration results, in order to filter out false positives, in accordance with still yet another embodiment.

FIG. 6 shows a method 600 for tracking a state of an object between identification of a change in the state of the object and identifying object enumeration results, in order to filter out false positives, in accordance with still yet another embodiment. As an option, the method 600 may be carried out in the context of the architecture and environment of FIGS. 1-5. For example, in one embodiment, the method 600 may be performed in the context of decision 506 of FIG. 5. Of course, however, the method 600 may be carried out in any desired environment. Again, it should also be noted that the aforementioned definitions may apply during the present description.

As shown in decision 602, it is determined whether a state in an object has changed. For example, such determination may be made by monitoring a public interface capable of being utilized to change the state of the object. In response to a determination that the state of the object has changed, monitoring of the state of the object is initiated. Note operation 604. With respect to the present embodiment, the state of the object may be monitored for identifying whether such object has been unlinked. In one embodiment, monitoring may include determining whether the object has been deleted, etc. It should be noted that such monitoring may be performed in any desired manner.

Further, it is determined whether the object has been unlinked, as shown in decision 606. Such determination may be made based on the monitoring described with respect to operation 604. If it is determined that the object has not been unlinked, it is further determined whether results of an object enumeration have been identified, as shown in decision 608. Such results may be identified by performing the object enumeration, identifying the results of the object enumeration in cache, etc.

If the results of the object enumeration have not been identified (e.g. if the identification of the results of the object enumeration are queued, etc.), it is again determined whether the object has been unlinked (operation 606). In this way, it may continuously be determined whether the object has been unlinked until results of the object enumeration have been identified.

In response to a determination that results of the object enumeration have been identified, the object is compared with such results for identifying an anomaly that at least potentially indicates unwanted activity. See operation 610. For example, the object may be compared with the results of the object enumeration for determining whether the object is included in such results. To this end, the object may only be compared with the results of the object enumeration if it is determined that the object has not been unlinked between the identification of the change in the state of the object and the identification of the object enumeration results.

However, in response to a determination that the object has been unlinked, comparison of the object with results of an object enumeration is prevented. In this way, a false positive identification of an anomaly that at least potentially indicates unwanted activity may be avoided. For example, in the context of the present embodiment, such false positive identification may be based on an object that has been unlinked prior to identifying object enumeration results (in which the unlinked object is not included) to which the object is compared.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for avoiding a false positive identification of an anomaly that potentially indicates unwanted activity based on an object that has been unlinked or deleted prior to identifying object enumeration results, comprising:
    identifying a change in a state of the object via a filter driver of a security system, wherein the object is included in a predetermined list of objects of an operating system being monitored for object manipulation events;
    determining whether the object has been unlinked or deleted;
    if it is determined that the object has not been unlinked, determining whether results of an object enumeration have been identified by a kernel enumeration interface that utilizes a directory in which the object is expected to be included;
    if it is determined that the results of the object enumeration have not been identified, determining repeatedly whether the object has been unlinked or deleted until the results of the object enumeration have been identified or in response to a determination that the object has been unlinked;
    if the object has not been unlinked nor deleted and if the results of the object enumeration have been identified, comparing the object with results of the object enumeration;
    if the object has been unlinked or deleted, preventing the comparing step;
    identifying at least potentially unwanted activity based on the comparison, wherein the identifying includes identifying an anomaly associated with the object being removed from a particular list a kernel of the operating system is to utilize for the object enumeration; and
    initiating an analysis of a process that requested the change in the state of the object, wherein the analysis is configured to identify a rootkit associated with the unwanted activity.

2. The method of claim 1, wherein the object includes a file.

3. The method of claim 1, wherein the object includes a registry.

4. The method of claim 1, wherein the state of the object is changed as a result of an object manipulation request.

5. The method of claim 1, wherein the state of the object includes an open state.

6. The method of claim 1, wherein the state of the object includes a write state.

7. The method of claim 1, wherein the change in the state of the object is identified by monitoring at least one application program interface.

8. The method of claim 1, wherein the results of the object enumeration include a list of objects.

9. The method of claim 1, wherein the object is compared with the results of the object enumeration based on a policy.

10. The method of claim 9, wherein the policy indicates that for each of a plurality of objects for which a state has changed, the comparison is performed randomly.

11. The method of claim 9, wherein the policy indicates that for each of a plurality of objects for which a state has changed, the comparison is performed only once per runtime.

12. The method of claim 1, further comprising noting the comparison as successful in cache if it is determined that the object is included in the results of the object enumeration.

13. The method of claim 1, wherein the at least potentially unwanted activity is identified if it is determined that the object does not match any portion of the results of the object enumeration.

14. A computer program product embodied on a non-transitory computer readable medium for performing operations for avoiding a false positive identification of an anomaly that potentially indicates unwanted activity based on an object that has been unlinked or deleted prior to identifying object enumeration results, the operations comprising:
  identifying a change in a state of the object via a filter driver of a security system, wherein the object is included in a predetermined list of objects of an operating system being monitored for object manipulation events;
  determining whether the object has been unlinked or deleted;
  if it is determined that the object has not been unlinked, determining whether results of an object enumeration have been identified by a kernel enumeration interface that utilizes a directory in which the object is expected to be included;
  if it is determined that the results of the object enumeration have not been identified, determining repeatedly whether the object has been unlinked or deleted until the results of the object enumeration have been identified or in response to a determination that the object has been unlinked;
  if the object has not been unlinked nor deleted and if the results of the object enumeration have been identified, comparing the object with results of the object enumeration provided by a kernel enumeration interface that utilizes a directory in which the object is expected to be included;
  if the object has been unlinked or deleted, preventing the comparing step;
  identifying at least potentially unwanted activity based on the comparison, wherein the identifying includes identifying an anomaly associated with the object being removed from a particular list a kernel of the operating system is to utilize for the object enumeration; and
  initiating an analysis of a process that requested the change in the state of the object, wherein the analysis is configured to identify a rootkit associated with the unwanted activity.

15. A system for avoiding a false positive identification of an anomaly that potentially indicates unwanted activity based on an object that has been unlinked or deleted prior to identifying object enumeration results, the system comprising:
  a processor, wherein the system is configured for:
    identifying a change in a state of the object via a filter driver of a security system, wherein the object is included in a predetermined list of objects of an operating system being monitored for object manipulation events;
    determining whether the object has been unlinked or deleted;
    if it is determined that the object has not been unlinked, determining whether results of an object enumeration have been identified by a kernel enumeration interface that utilizes a directory in which the object is expected to be included;
    if it is determined that the results of the object enumeration have not been identified, determining repeatedly whether the object has been unlinked or deleted until the results of the object enumeration have been identified or in response to a determination that the object has been unlinked;
    if the object has not been unlinked nor deleted and if the results of the object enumeration have been identified, comparing the object with results of the object enumeration;
    if the object has been unlinked or deleted, preventing the comparing step;
    identifying at least potentially unwanted activity based on the comparison, wherein the identifying includes identifying an anomaly associated with the object being removed from a particular list a kernel of the operating system is to utilize for the object enumeration; and
    initiating an analysis of a process that requested the change in the state of the object, wherein the analysis is configured to identify a rootkit associated with the unwanted activity.

16. The system of claim 15, wherein the processor is coupled to memory via a bus.

* * * * *